(12) United States Patent
Li et al.

(10) Patent No.: US 8,442,539 B2
(45) Date of Patent: May 14, 2013

(54) TECHNIQUES FOR SUPPORTING LOW DUTY CYCLE MODE OF BASE STATION

(75) Inventors: Ying Li, Garland, TX (US); Zhouyue Pi, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 611 days.

(21) Appl. No.: 12/705,019

(22) Filed: Feb. 12, 2010

(65) Prior Publication Data

US 2010/0220621 A1 Sep. 2, 2010

Related U.S. Application Data

(60) Provisional application No. 61/208,818, filed on Feb. 27, 2009.

(51) Int. Cl.
*H04W 72/00* (2009.01)
*H04M 1/00* (2006.01)
*H04M 3/00* (2006.01)

(52) U.S. Cl.
USPC ............... 455/444; 455/452.1; 455/453.1; 455/552.1; 455/419

(58) Field of Classification Search ............ 455/39, 455/73, 574, 502, 450, 419, 452.1, 453.1, 455/552.1
See application file for complete search history.

(56) References Cited

U.S. PATENT DOCUMENTS

| 8,018,884 | B2 * | 9/2011 | Lee et al. ................. 370/311 |
| 2009/0147877 | A1 * | 6/2009 | Connors et al. ............ 375/267 |
| 2010/0323610 | A1 * | 12/2010 | Li et al. .................. 455/3.01 |
| 2011/0244792 | A1 * | 10/2011 | Park et al. .................. 455/39 |
| 2012/0015649 | A1 * | 1/2012 | Li et al. ................... 455/434 |
| 2012/0077486 | A1 * | 3/2012 | Park et al. ............... 455/422.1 |
| 2012/0149358 | A1 * | 6/2012 | Lim ........................ 455/419 |

* cited by examiner

*Primary Examiner* — Tilahun B Gesesse
(74) *Attorney, Agent, or Firm* — Jefferson IP Law, LLP

(57) ABSTRACT

A Mobile Station (MS) apparatus and method, to search for a Base Station (BS) in a Low Duty Cycle (LDC) mode in a wireless communication system, and a network entity apparatus and method, assist or support the MS, are provided. The method for the MS to search for the BS in LDC mode in the wireless communication system includes obtaining LDC information of one or more BSs in LDC mode, determining the LDC patterns of the one or more BSs in LDC mode based on the LDC information, the LDC patterns comprising at least one of an Available Interval (AI), an UnAvailable Interval (UAI), a starting time of the AI, an ending time of the AI, a length of the AI, a starting time of the UAI, an ending time of the UAI, a length of the UAI, and a cycle of the LDC, searching for any of the one or more BSs in LDC mode during their respective AI, and if a BS is found, performing a follow-up operation based on the found BS.

40 Claims, 8 Drawing Sheets

TECHNIQUES FOR SUPPORTING LOW DUTY CYCLE MODE OF BASE STATION

CROSS-REFERENCE TO RELATED APPLICATIONS

This application claims the benefit under 35 U.S.C. §119 (e) of a U.S. Provisional application filed on Feb. 27, 2009 in the U.S. Patent and Trademark Office and assigned Ser. No. 61/208,818, the entire disclosure of which is hereby incorporated by reference.

BACKGROUND OF THE INVENTION

1. Field of the Invention

The present invention relates to a wireless communication system. More particularly, the present invention relates to techniques for supporting a Low Duty Cycle (LDC) mode of a Base Station (BS) of a wireless communication system.

2. Description of the Related Art

In a typical wireless communication system, a service, such as a voice and/or data service, is provided to Mobile Stations (MSs) through a plurality of Macrocell Base Stations (MBSs). Each of the MBSs is responsible for providing a service to MSs located within their respective service coverage area. The service coverage area of an MBS is hereafter referred to as a Macrocell. To facilitate mobility of the MSs, handoff between MBSs is performed when the MS leaves one Macrocell for another.

In the wireless communication system, a channel may deteriorate due to a number of factors, including a geographical factor inside a Macrocell, a distance between an MS and an MBS, movement of the MS, etc. The channel deterioration is problematic since it may result in a disruption of communication between the MS and the MBS. For example, when the MS is located inside a structure, such as an office building or a house, a channel between the MBS and the MS may deteriorate due a shadow region that is formed by the structure. A shadow region formed within the structure is hereafter referred to as an indoor shadow region. The MS located in the indoor shadow region may not be able to adequately perform communication with the MBS. Further, an MBS may have inadequate capacity to service all users in its Macrocell. To address the shortcomings of the MBS, a variety of other Base Stations (BSs) have been proposed, including a Relay, Picocell, Microcell, Femtocell, Ubicell etc. Since the Femtocell is a more recent concept, the Femtocell concept will be explained further below.

The Femtocell concept is proposed to provide ubiquitous connectivity to MSs and improve wireless capacity, while addressing a service limitation of an indoor shadow region. A Femtocell is a small cell coverage area that is serviced by a low power Femtocell BS (FBS) that accesses a wireless communication Core Network (CN) via a commercial broadband network or via a wireless connection to a backhaul of the wireless communication system. Hereafter, the term "Femtocell" may be used interchangeably with the term "FBS." The deployment of the Femtocell improves both the coverage and capacity of the wireless communication system. Going forward, the advantages of the Femtocell are expected to be increasingly leveraged in wireless communication systems. Since the Femtocell is much smaller than a Macrocell, a plurality of Femtocells may exist within one Macrocell. The FBS is capable of providing service to relatively a small number of MSs, unlike the MBS, which is capable of providing service to a large number of MSs. The FBS typically operates in a licensed spectrum and may use the same or different frequency as the MBS. Further, MSs serviced by an FBS are typically stationary or moving at low (i.e., pedestrian) speed. Similar to the need for handoff between MBSs, handoff between the Femtocell and the Macrocell, and handoff between Femtocells, is a key function in securing service continuity of an MS.

The FBS may be installed inside or adjacent to an indoor space to which it is intended to provide service, such as a home or Small Office/Home Office (SOHO). Installation of the FBS is significantly easier than installation of the MBS and the FBS may be purchased and installed by a subscriber for use in conjunction with the wireless communication system. Here, the subscriber or service provider may desire to limit access to the FBS and only provide access to authorized MSs. To facilitate this arrangement, a Closed Subscriber Group (CSG) FBS may be employed. The CSG FBS can be further categorized as a CSG-closed and a CSG-open FBS. A CSG-closed FBS may only provide access to authorized MSs, except for emergency services and National Security/Emergency Preparedness (NS/EP) services. A CSG-open FBS may, in addition, allow non-subscribers of the CSG a low priority access or a best-effort access, to guarantee the Quality of Service (QoS) of the subscribers. Alternatively, an Open Subscriber Group (OSG) FBS may be employed that provides access to any MS.

The FBS has different operational requirements than the MBS, the specifics of which may differ depending on the wireless communication system it is implemented in. For example, in a wireless communication system operating according to the Institute of Electrical and Electronics Engineers (IEEE) 802.16m standard, it is required that the air interface support features needed to limit MSs scanning for FBSs. Further it is required that the air interface support MSs in being able to access and handover to CSG FBSs if they are designated as part of the CSG. In addition, it is required that the air interface supports preferred access and handover of mobile stations to their designated FBSs. Also, it is required that the air interface supports optimized and seamless session continuity and handover between FBSs and Wireless Fidelity (WiFi) access systems. Further, it is required that the air interface allows for a dense deployment of a large number of Femtocells in a wireless communication system.

Given the above requirements for the Femtocell, which differ from the requirements of the Macrocell, there are a number of issues that arise with the deployment of the Femtocell in a wireless communication system. For example, when Femtocells are densely deployed, interference may be introduced from the Femtocells to Macrocells and to other Femtocells. This is particularly evident in the case of the CSG FBS, which only provides service to authorized MSs. When an unauthorized MS enters the Femtocell of the CSG FBS, the unauthorized MS will receive a strong signal from the CSG FBS. However, since the MS is unauthorized, the MS will not be able take advantage of the strong signal of the CSG FBS for service. Thus, the signal ends up being strong interference to the unauthorized MS. To reduce the interference to others, the FBS may enter a Low Duty Cycle (LDC) mode in different situations, for example, when there are no MSs in its Femtocell, when there is no active MS or connected MS in the Femtocell, when all the MSs attached to the Femtocell are in idle mode or sleep mode, etc. When in the LDC mode, the FBS may be available—or active in limited resources such as time and/or frequency in the air interface.

The concept of an LDC mode is a new. Such a concept for Macrocells has not previously been investigated because it is very rare that a Macrocell does not have any active or prospective MSs within its Macrocell. However, the situation is different for FBSs, where it is common not to have any active or prospective MSs in its Femtocell. For example, consider a situation where a user leaves his home, in which an FBS is disposed. In this case, the LDC mode may be employed to reduce power consumption of the FBS and may reduce the interference caused by the FBS to other entities. While the LDC mode is particularly advantageous for Femtocells, the LDC mode may also be advantageous for other BSs, including Relays, Picocells, Microcells, Macrocells, etc.

While the benefits of implementing the LDC mode are evident, there are a number of issues regarding the LDC mode that need to be addressed in order to support the LDC mode of a BS, such as an FBS. Exemplary issues that need to be addressed include the leaving and entering of the LDC mode by the BS, the waking up of the BS in the LDC mode, and how the MS will scan, monitor, and perform Network Entry (NE) to the BS in the LDC mode. These issues, as well as others, are new and need to be resolved. Some of these issues have been discussed with respect to Femtocells, as will be described below.

With respect to Femtocells, it has been suggested that, to perform NE to Femtocells in the LDC mode, the MS should know the resource (e.g., time, frequency) assigned to the FBS, such as the timing of an Available Interval (AI) of the LDC mode of the corresponding FBS, and carrier frequency. However, no specific technique has been proposed to achieve this. Further, with respect to Femtocells, it has been suggested that different CSG FBSs within the same Macrocell should become available at non-overlapping time slots, in order to hide themselves from unauthorized MSs. However, such a scheme may not be effective since an MS in active communication will scan for all FBSs, including the CSG FBSs using the non-overlapping active time slots, despite the MS not being authorized to receive service from those FBSs. In addition, while the scheme may be useful to reduce interference among CSG Femtocells, there may not be a need for all Femtocells within the same Macrocell to be in different active slots, because only neighboring Femtocells cause the femto-to-femto interference.

In addition, with respect to Femtocells, it has been suggested that the MS may wake up an FBS in the LDC mode by sending a wake-up ranging code, wherein the wake-up ranging code is a ranging code that has been reserved for this purpose. However, how to reserve such ranging code systematically and efficiently has not yet been proposed. Further, how exactly to perform NE to Femtocells in the LDC mode has not been proposed.

Moreover, with respect to Femtocells, it has been suggested that the MBS should broadcast Frequency Allocation (FA) and scrambling codes of FBSs within their Macrocell in order to assist the MS in finding a Femtocell. While it is beneficial for the MS, which is searching for a Femtocell, to know the FAs of Femtocells, the benefit is mitigated for Femtocells in the LDC mode. To find Femtocells in the LDC mode, it would be beneficial for the MS to know the starting time and length of the AI of the LDC mode of the Femtocells. Knowing the starting time and length of the AI of the LDC mode of the Femtocells would enable the MS to expedite searching for Femtocells in the LDC mode as well as increase the chance of finding the Femtocells in the LDC mode. However, it has not been suggested how to utilize the information of available timing and interval of Femtocells to assist MSs in their search for Femtocells.

Accordingly, despite the issues regarding the LDC mode being discussed with respect to Femtocells, the issues regarding the LDC mode of how to assist an MS to efficiently scan and search for a BS in the LDC mode, how to perform NE and handover to a BS in the LDC mode, how and when to wake up a BS in the LDC mode, and so on, remain to be addressed.

Therefore, a need exists for techniques to support the LDC mode of a BS of a wireless communication system.

SUMMARY OF THE INVENTION

An aspect of the present invention is to address at least the above-mentioned problems and/or disadvantages and to provide at least the advantages described below. Accordingly, an aspect of the present invention is to provide techniques to support a Low Duty Cycle (LDC) mode of a Base Station (BS) of a wireless communication system. While the BS may be a Femtocell BS (FBS), the BS may be any other type of BS, including a Relay, a Picocell, a Microcell, a Macrocell, a Ubicell, etc.

In accordance with an aspect of the present invention, a method for a Mobile Station (MS) to search for a BS in LDC mode in a wireless communication system is provided. The method includes obtaining LDC information of one or more BSs in LDC mode, determining the LDC patterns of the one or more BSs in LDC mode based on the LDC information, the LDC patterns comprising at least one of an Available Interval (AI), an UnAvailable Interval (UAI), a starting time of the AI, an ending time of the AI, a length of the AI, a starting time of the UAI, an ending time of the UAI, a length of the UAI, and a cycle of the LDC, searching for any of the one or more BSs in LDC mode during their respective AI, and if a BS is found, performing a follow-up operation based on the found BS.

In accordance with another aspect of the present invention, an MS apparatus to search for a BS in LDC mode in a wireless communication system is provided. The apparatus includes a receiver, a transmitter, and a controller. The receiver receives signals from at least one BS. The transmitter transmits signals to the at least one BS. The controller controls the receiver and transmitter, and controls to obtain LDC information of one or more BSs in LDC mode, determines the LDC patterns of the one or more BSs in LDC mode based on the LDC information, the LDC patterns comprising at least one of an AI, a UAI, a starting time of the AI, an ending time of the AI, a length of the AI, a starting time of the UAI, an ending time of the UAI, a length of the UAI, and a cycle of the LDC, controls to search for any of the one or more BSs in LDC mode during their respective AI, and, if a BS is found, controls to perform a follow-up operation based on the found BS.

In accordance with yet another aspect of the present invention, a method for a network entity in a wireless communication network to assist or support a MS to search for a BS in LDC mode is provided. The method includes obtaining LDC information of LDC patterns of one or more BSs in LDC mode, the LDC patterns comprising at least one of an AI, a UAI, a starting time of the AI, an ending time of the AI, a length of the AI, a starting time of the UAI, an ending time of the UAI, a length of the UAI, and a cycle of the LDC, generating a message including at least a portion of the LDC information, and sending the generated message to the MS.

In accordance with still another aspect of the present invention, a network entity apparatus in a wireless communication network to assist or support a MS to search for a BS in LDC mode is provided. The apparatus includes a receiver for receiving signals from at least one MS, a transmitter for transmitting signals to the at the least one MS, a network transceiver for receiver and transmitting signals from and to at least one other network entity apparatus in the wireless communication network, and a controller. The controller controls the receiver, transmitter and network transceiver, controls to obtain LDC information of LDC patterns of one or more BSs in LDC mode, the LDC patterns comprising at least one of an AI, an UAI, a starting time of the AI, an ending time of the AI, a length of the AI, a starting time of the UAI, an ending time of the UAI, a length of the UAI, and a cycle of the LDC, controls to generate a message including at least a portion of the LDC information, and controls to send the generated message to at least one MS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
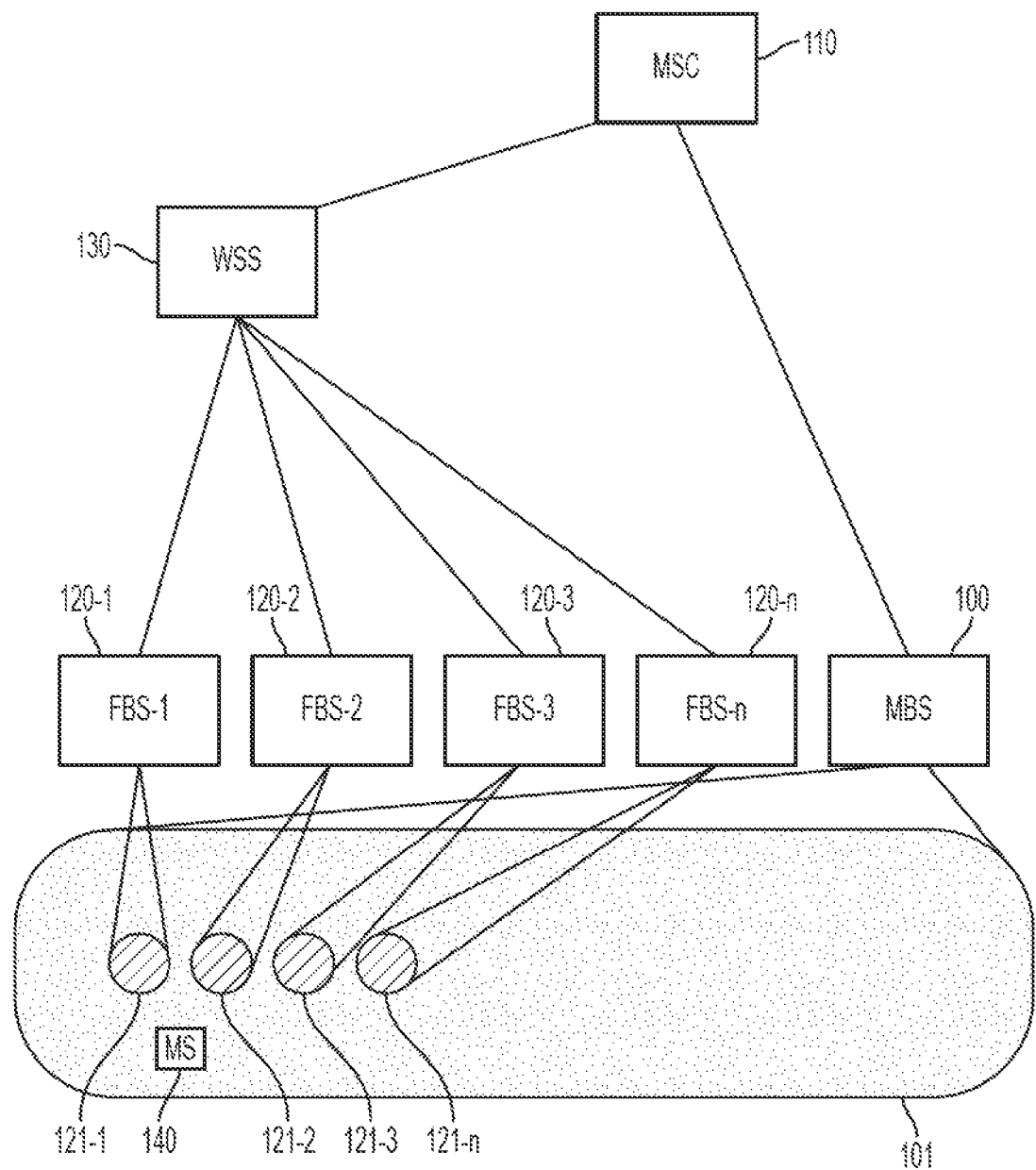
FIG. 1 illustrates a wireless communication system for supporting an Low Duty Cycle (LDC) mode of Femtocell Base Stations (FBSs) according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention described below relate to techniques for supporting a Low Duty Cycle (LDC) mode of a Base Station (BS) of a wireless communication system. More specifically, exemplary embodiments of the present invention described below relate to techniques for a Mobile Station (MS) to search for, scan, and/or (re)select, and/or perform network (re)entry to a Base Station in an LDC mode in a wireless communication system. Exemplary embodiments of the present invention are hereafter described with a limited number and types of BSs, a limited number of LDC patterns, or limited use cases for ease of explanation. However, the present invention is equally applicable to an arbitrary number and types of BSs and an arbitrary number of LDC patterns and other related use cases. For instance, while Femtocells are described herein as an example of a BS that can have LDC mode, any other types of the BSs can implement the LDC mode and the invention is applicable to any system having a network entity that has the LDC mode. For example, the BS may be any type of BS other than a FBS, including a Relay, a Picocell, a Microcell, a Macrocell, a Ubicell, etc.

It should be understood that the following description might refer to terms utilized in various standards merely for simplicity of explanation. For example, the following description may refer to terms utilized in the Institute of Electrical and Electronics Engineers (IEEE) 802.16m standard or the $3^{rd}$ Generation Partnership Project (3GPP) Long Term Evolution (LTE) standard. However, this description should not be interpreted as being limited to the IEEE 802.16m or 3GPP LTE standards. Independent of the mechanism used to implement a BS, in a wireless communication system, it is preferable to support the LDC mode and it is advantageous for that ability to conform to a standardized mechanism. It is also understood that the terms "LDC mode pattern" and "LDC pattern" are used interchangeably hereinafter.

Exemplary embodiments of the present invention will be described in the context of a wireless communication system described below with reference to FIG. 1.

FIG. 1 illustrates a wireless communication system for supporting an LDC mode of FBSs according to an exemplary embodiment of the present invention.

Regarding FIG. 1, the wireless communication system includes a Macro Base Station (MBS) 100 servicing a Macrocell 101, a Mobile Switching Center (MSC) 110, a plurality of FBSs 120-1 . . . 120-n servicing respective Femtocells 121-1 . . . 121-n located within Macrocell 101, a Wireless Soft Switch (WSS) 130, and a MS 140. The term "Femtocell" may be used interchangeably with the term "FBS." Likewise, the term "Macrocell" may be used interchangeably with the term "MBS."

This configuration of the wireless communication system is merely an example. Exemplary embodiments of the present invention are equally applicable to other configurations of the wireless communication system. For example, the wireless communication system/network may include any number of additional MBSs, MSCs, FBSs, WSSs, and MSs, or any number of additional BSs of other types or other tiers, such as Pico, Micro, Relay cells, or any other network entities such as a Self-Organized Network (SON) server that can manage and coordinate cells and other entities. Any combination of any number of other types of BSs may implement the LDC mode. Further, the wireless communication system may include other network elements, which are omitted herein for conciseness. In addition, the wireless communication system may be a wireless communication system operating according to the IEEE 802.16m standards, 3GPP LTE standards, or any other wireless communication standards.

Any number of Femtocells 121-1 . . . 121-n may at least partially overlap with any number of other Femtocells 121-1 . . . 121-n. Further, at least a portion of any number of Femtocells 121-1 . . . 121-n may be disposed outside Macrocell 101 and/or overlap with another Macrocell (not shown). While FBSs 120-1 . . . 120-n are assumed to be of the same type, any number of the FBS 120-1 . . . 120-n may be of different types. In addition any number of the FBSs 120-1 . . . 120-n may be a Closed Subscriber Group (CSG) FBS or an Open Subscriber Group (OSG) FBS. Further, any number of the FBSs 120-1 . . . 120-n may employ an LDC mode.

The MSC 110 communicates with MBS 100 and WSS 130. Alternatively, or in addition, MBS 100 and WSS 130 may directly communicate with each other. The communications between MBS 100 and WSS 130 may occur via a backhaul through a backbone network of the wireless communication system. The FBSs 120-1 . . . 120-n may communicate with WSS 130 through a commercial broadband network. FBSs 120-1 . . . 120-n may communicate with each other through WSS 130. Alternatively, or in addition, FBSs 120-1 . . . 120-n may directly communicate with each other through at least one of a direct wireless connection or a commercial broadband connection. FBSs 120-1 . . . 120-n may directly communicate with at least one of MSC 110 and MBS 100. FBSs 120-1 . . . 120-n and MBS 100 may also communicate with a SON server.

MS 140 may be mobile or stationary and may be located inside or outside any of Macrocell 101 and Femtocells 121-1 . . . 121-n. Handoff between any of the MBS 100 and FBSs 120-1 . . . 120-n is employed for service continuity of the MS 140.

Techniques to support the LDC mode of Femtocells in a wireless communication system, according to exemplary embodiments of the present invention, will be described below in the context of the exemplary wireless communication system described above with reference to FIG. 1.

In order to avoid causing interference to other entities, an FBS may employ an LDC mode. When in an LDC mode, the FBS is active with limited resources, such as for limited period of time and/or in a limited set of frequency resources of the air interface. The FBS may enter the LDC mode in some situations, such as when there is no MS located within the Femtocell of the FBS, when all the MSs in the femtocell are in an idle or sleep mode, when there is no MS connected with the FBS, or when there is no MS in an active mode attached to the FBS. The LDC mode will be described in further detail below with reference to FIG. 2.

Figure 2:
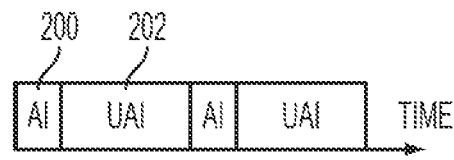
FIG. 2 illustrates an LDC mode of a BS in a wireless communication system according to an exemplary embodiment of the present invention.

FIG. 2 illustrates an LDC mode of a BS in a wireless communication system according to an exemplary embodiment of the present invention.

Referring to FIG. 2, the exemplary LDC mode includes an Available Interval (AI) 200 and an UnAvailable Interval (UAI) 202 that alternate over time. Alternatively, the AI 200 and UAI 202 may alternate in the frequency domain. The AI 200 may have a shorter duration than the UAI 202. The AI 200 may be long enough for an MS to measure the signal strength of a BS. During the AI 200, the BS has active resources of the air interface and thus the BS may transmit/receive signals during this interval. In contrast, during the UAI 202, the BS may not transmit in the air interface, or it may still transmit limited signals such as Synchronization CHannel (SCH) (or preambles) or Broadcast CHannel (BCH) (such as superframe header, or some essential system information blocks), but it transmits fewer signals than during the AI 200. In other words, during UAI 202 some signal is not transmitted by the BS or the signal is unavailable via the air interface from the BS to the MS. However, during the UAI 202, the BS may receive signals via the air interface and the BS may communicate with the core network via a backhaul. If there is no active user in the BS's cell coverage area, the BS may enter the LDC mode to prevent interference from being caused to other entities and to save energy. Herein, the BS may be any type of BS, including a Relay, a Picocell, a Microcell, an MBS, an FBS, a Ubicell, etc.

As previously discussed, the LDC mode is a new attribute for BSs. Such a concept has not previously been needed for the MBS because it is very rare that there are not any active or prospective MSs in its Macrocell. However, for other smaller sized BSs, such as a Relay, Picocell, Microcell, Ubicell, and the FBS, it is quite common to have no active or prospective MSs in its service coverage area. However, the LDC mode can also be extended to the Macrocell. Accordingly, since the LDC mode is new, there is an outstanding problem of how to support the LDC mode of a BS. For example, there are new issues that need to be resolved, including when a BS will leave and enter the LDC mode, how to wake up a BS in the LDC mode, how an MS scans, monitors, and performs Network Entry (NE) or Re-Entry to a BS in LDC mode, and so on.

Accordingly, there are many challenges in supporting the LDC mode of a BS. While many of these challenges exist for various types of BSs implementing the LDC mode, these challenges may be clearly exemplified in the context of an FBS. Firstly, in the context of an FBS, it is challenging for an MS, on its own, to find Femtocells in a regular duty cycle mode, let alone Femtocells in the LDC mode. More specifically, it is challenging to find Femtocells in the regular duty cycle because there may be a large number of Femtocells near an MS, some of which may be preferred Femtocells while others may be CSG Femtocells that the MS is not authorized to receive service from. However, finding Femtocells in the LDC mode is even more challenging because Femtocells in the LDC mode may be only available during a limited time period on limited frequency resources.

Secondly, in the context of an FBS, it is challenging for an MBS to assist an MS in finding Femtocells in the LDC mode. In a wireless communication system without Femtocells, an MS will receive from its serving MBS a neighbor list of nearby MBSs. The MS will then scan and monitor neighboring MBSs in the list. Typically, there is only a small number of neighboring MBSs and thus, the neighbor list only has a limited amount of information. However, in a system with Femtocells, an MS might have to find neighboring Femtocells by itself, without the guidance from an MBS, if the MBS does not broadcast a neighbor list of Femtocells or the LDC information of these Femtocells. Here, the MBS may not broadcast the neighbor list of Femtocells or the LDC information of these Femtocells because there are too many Femtocells and the resulting neighbor list would be correspondingly too large and thus require too much overhead. Despite this, it is desirable if the MBS could provide some useful information to the MS via a broadcast/multicast/unicast within a limited amount of overhead.

Thirdly, in the context of an FBS, it is challenging to decide when and how to efficiently and effectively wake up the FBS in LDC mode. For instance, an FBS in the LDC mode may only be broadcasting very limited information about itself. However, an MS needs to be able to wake the FBS up based on that limited information.

Hereafter, techniques for supporting the LDC mode of BSs in a wireless communication system, according to exemplary embodiments of the present invention, will be described that address the challenges discussed above. For conciseness in explanation, the techniques for supporting the LDC mode of BSs in a wireless communication system will be described below in the context of a wireless communication system including FBSs implementing the LDC mode, such as the wireless communication system described above with reference to FIG. 1. However, the present invention is equally applicable when any number of other types of BSs is implementing the LDC mode, such as a Relay, a Picocell, a Microcell, an MBS, a Ubicell, etc.

In an exemplary implementation of the present invention, the MS has, stores, or is provided with the information on the carrier frequency or Frequency Allocations (FAs) of Femtocells (and/or other types of BSs), and/or the LDC patterns, including the timings of AIs, UAIs, such as the start timing of the AIs, length of the AIs, length of the UAIs, etc., of Femtocells (and/or other types of BSs) in the LDC mode. The information may be limited to Femtocells the MS is authorized to receive service from, or may be unlimited. Further, the MS may have stored the information and the information may be provided to the MS by the network (including network entities such as a Macrocell, Femtocell, Ubicell, Picocell, Microcell, SON server, upper layer applications, etc.) e.g., by broadcasting, multicasting, unicasting, pre-provisioning, etc. The information may be updated by the network (including network entities such as Macrocell, Femtocell, Ubicell, Picocell, Microcell, SON server, upper layer applications, etc.) e.g., by broadcasting, multicasting, unicasting, pre-provisioning, etc. The information may include a mapping of FA to LDC patterns, where FBSs with the same FA may have the same AIs or some common available durations in AIs (overlapped) in the LDC mode, and FBSs with different FAs may have different AIs or some available durations (within the AIs) non-overlapped in LDC mode. The said available duration can be a subset of the AI. The MS uses this information to scan for FBSs (and/or other types of BSs). The scan for the FBSs may be for cell (re)selection, NE or HandOver (HO), etc. In addition, the Femtocells may be either an OSG Femtocell or a CSG Femtocell. Note that the MS may have to scan different FAs at different times, since the MS may only have the capability of using one FA at one time. If the length of the AI is just enough for the MS to measure the signal strength from the FBS, then the AIs of the FBSs with different FAs may not be overlapped. If the length of the AI is more than long enough for the MS to measure the signal strength from the FBS, then the AIs of the FBSs with different FAs may be overlapped, as long as the AIs can be long enough for the MS to scan and measure FBSs with different FAs. The AIs of the FBSs with the same FA may be the same, or overlapped with some common duration which is enough for the MS to measure the FBSs, if the MS performs scanning of the FBSs with the same FA at one time. If the MS has enough time to perform scanning the FBSs with the same FA at multiple times as well as scanning the FBSs with different FAs in one LDC mode cycle, then the AIs of the FBSs with the same FA may not be necessarily aligned or overlapped, and instead, they can be separated.

One of the benefits of this exemplary implementation is that it may shorten the duration for the MS to find Femtocells (and/or other types of BSs) in the LDC mode, e.g., by aligning the AIs of the FBSs with the same FA. Another benefit of this exemplary implementation is that it may reduce overhead in notifying/updating the MS about the LDC patterns, e.g., via broadcasting or via multicasting/unicasting, or the first time provisioning to the MS when the MS enters the network, etc. It can also reduce the storage space needed for the MS to store the information. This exemplary implementation of the present invention is explained in more detail below.

An example of the information on LDC patterns of allowable Femtocells that the MS has is shown in Table 1. Of course, the information on LDC patterns may include those of other types of BSs. In Table 1, it is assumed that the AI length is L and the cycle of the LDC mode is T. However, the LDC mode pattern can be different based on a different AI length or a different LDC mode. Basically, the LDC mode pattern can be defined by the AI stating time, AI length, and cycle of LDC mode; or AI length, UAI length, and the AI starting time; or AI starting time, AI ending time, and UAI ending time; or AI starting time, AI length, and UAI ending time; etc. Usually, three parameters are needed for the LDC mode pattern definition. However, the LDC mode pattern definition may include other combinations or types of information.

TABLE 1

| Femtocells | FA | LDC pattern (AI length being L and time between two AIs being T) |
|---|---|---|
| Femtocell ID1 | 1 | P1: AI starts at time 1 |
| Femtocell ID2 | 1 | P1: AI starts at time 1 |
| Femtocell ID3 | 2 | P2: AI starts at time 2 |
| Femtocell ID4 | 2 | P2: AI starts at time 2 |
| Femtocell ID5 | 3 | P3: AI starts at time 3 |
| Femtocell ID6 | 3 | P3: AI starts at time 3 |

The information on the LDC patterns may be used to enable the MS to scan for Femtocells (and/or other types of BSs), even if the MS does not know whether a Femtocell is in the LDC mode. For instance, when the MS wants to perform a NE to a Femtocell, the MS scans for the Femtocell without knowing whether the Femtocell is in the LDC mode. However, since the MS is already aware of the information of the LDC pattern of the Femtocell, the MS may assume that the Femtocell is in LDC mode and may scan for the Femtocell during its AI and on its FA.

An MBS or an FBS may provide and/or update (e.g., via broadcasting, unicasting, multicasting, network, or upper layers, etc.) the LDC pattern of nearby Femtocells (and/or other types of BSs). For instance, such information may be included in an FBS ADVertisement (FBS_ADV) message which includes the information about the FA and LDC patterns. A Femtocell (or other type of BS) may broadcast its own LDC pattern to the MS as well. The message, as the neighbor list advertisement message or other Multiple Access Control (MAC) management messages, can be broadcasted, multicasted, or unicasted. The message also can be part of other existing messages (e.g., piggi-backed). An example of the information included the FBS_ADV message is shown in Table 2. In Table 2, LDC patterns are denoted as LDC Px, where each of the LDC pattern can be captured as a triple of the parameters as explained earlier (e.g., starting time of the AIs, AI length, UAI length, or starting time of the AIs, AI length, LDC cycle, etc.). The same mapping can be provided to the MS via networks, or upper layers, etc., without using a particular massage of the FBS_ADV.

TABLE 2

| FBS_ADV | | |
|---|---|---|
| Femtocell ID1 | FA1 | LDC P1 |
| Femtocell ID2 | FA1 | LDC P1 |
| Femtocell ID3 | FA2 | LDC P2 |
| Femtocell ID4 | FA2 | LDC P2 |
| Femtocell ID5 | FA3 | LDC P3 |
| Femtocell ID6 | FA3 | LDC P3 |

If there are a large number of Femtocells (and/or other types of BSs) in a Macrocell, the FBS_ADV message transmitted by the MBS may be too large. To address this issue, the FBS_ADV message may only include a mapping of FAs to the LDC pattern. This would reduce the overhead in transmitting (e.g., broadcasting/multicasting/unicasting, etc.) the FBS_ADV message. An example of the FBS_ADV message that only includes a mapping of FAs to the LDC pattern is shown in Table 3. The same mapping can be provided to the MS via networks, or upper layers, etc., without using a particular massage of the FBS_ADV.

TABLE 3

| FBS_ADV | |
|---|---|
| Femtocell FA1 | LDC P1 |
| Femtocell FA2 | LDC P2 |
| Femtocell FA3 | LDC P3 |

Regarding the FBS_ADV message, the structure and name of this message shown and described herein is merely an example as this message may have different names and/or structures. Further, while it is preferred that the FBS_ADV message is sent in a BCH, the FBS_ADV message may be sent any other way, such as unicast/multicast, etc. The BCH is the control channel on which the FBS, MBS, or other type of BS broadcasts system information. For example, in an Orthogonal Frequency-Division Multiplexing (OFDM) based Multiple-Input-Multiple-Output (MIMO) wireless communication system, the BCH may include information about one or more of system bandwidth, antenna configuration, configuration of other control channels, and other system configurations. Since the BCH includes important information, the MS needs to correctly detect the BCH in order to establish further communication with the corresponding FBS, MBS, or other type of BS. The term "BCH" may be referred to as one or more channels having a different name in other wireless communication systems.

The purpose for the FBSs (and/or other types of BSs) with the same FA to use the same available timings in the LDC mode is to save the scanning time for the MS, because for a given FA, if the AIs are aligned, the MS may get the preambles and the measurements from the SCH for a batch of the Femtocells (and/or other types of BSs) using that FA, and then the MS can further compare and decide which BSs to be further scanned to get the BCH information. The purpose for the FBSs (and/or other types of BSs) with different FAs to use different AIs in the LDC mode is to not miss Femtocells (and/or other types of BSs) operating on different FAs.

An example according to an exemplary embodiment of the present invention of Femtocells with the same FA using the same AI and the MS scanning correspondingly is described below with reference to FIG. 3.

Figure 3:
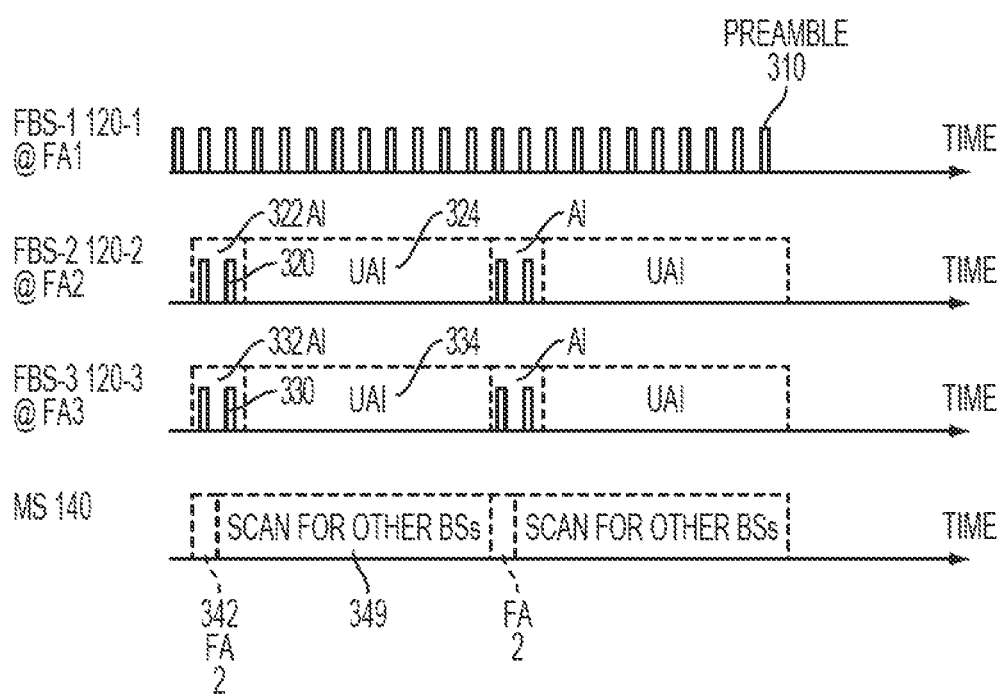
FIG. 3 illustrates timings of Femtocells with the same Frequency Allocation (FA) using the same Available Interval (AI) and a Mobile Station (MS) scanning correspondingly, according to an exemplary embodiment of the present invention.

FIG. 3 illustrates timings of Femtocells with the same FA using the same AI and an MS scanning correspondingly, according to an exemplary embodiment of the present invention.

Referring to FIG. 3, the active timings of FBS-1 120-1, FBS-2 120-2, FBS 120-3, and the scanning periods of MS 140 are shown. Here, FBS-1 120-1 is operating on a first FA FA1 in a regular mode and is periodically transmitting a preamble signal 310 in its Synchronization Channel (SCH) and BCH signals, and/or other signals. In FIG. 3, preambles are shown for simplicity and solely for the purpose of illustration of different frames/superframes to show the periodicity, however, there can be many other signals transmitted. Also, depending on the scenario of the LDC mode, in UAI there may be nothing transmitted, or some signal such as preamble transmitted, etc., as long as in the UAI there are fewer signals transmitting than in the AI. FBS-2 120-2 and FBS 120-3 are both operating on a second FA FA2 in an LDC mode and are periodically transmitting preamble signals 320 and 330 in their SCHs and other signals during their AIs 322 and 332 and are not transmitting as much as in AIs during their UAIs 324 and 334. The AIs 322 and 332 and UAIs 324 and 334 of FBS-2 120-2 and FBS-3 120-3 may have substantially the same duration and may occur at substantially the same time.

MS 140 scans for FBS-2 120-2 and FBS-3 120-3 on FA2 during scanning period 342, which may at least partially overlap in time with AIs 322 and 332. Here, MS 140 may attempt to synchronize to FBS-2 120-2 and FBS-3 120-3 and may acquire further information (such as from a BCH, which may contain the Closed Subscriber Group (CSG) IDentifiers (IDs) or FBS IDs, with which the MS can compare the stored subscribed CSG IDs or FBS IDs. If the received CSG ID or FBS ID matches the stored list in the MS, the MS then knows the FBS is allowable for it to access) from FBS-2 120-2 and FBS-3 120-3 to determine whether the MS 140 is authorized to receive service from either of the FBS-2 120-2 and FBS-3 120-3. MS 140 may scan on other FAs, such as FA1, during scanning period 349 for other BSs, e.g., macrocells, Femtocells, such as FBS-1 120-1, etc. Scanning period 349 may at least partially overlap with the UAIs 324 and 334 of FBS-2 120-2 and FBS-3 120-3.

An example according to an exemplary embodiment of the present invention of Femtocells with different FAs using different AIs and the MS scanning correspondingly is described below with reference to FIG. 4.

Figure 4:
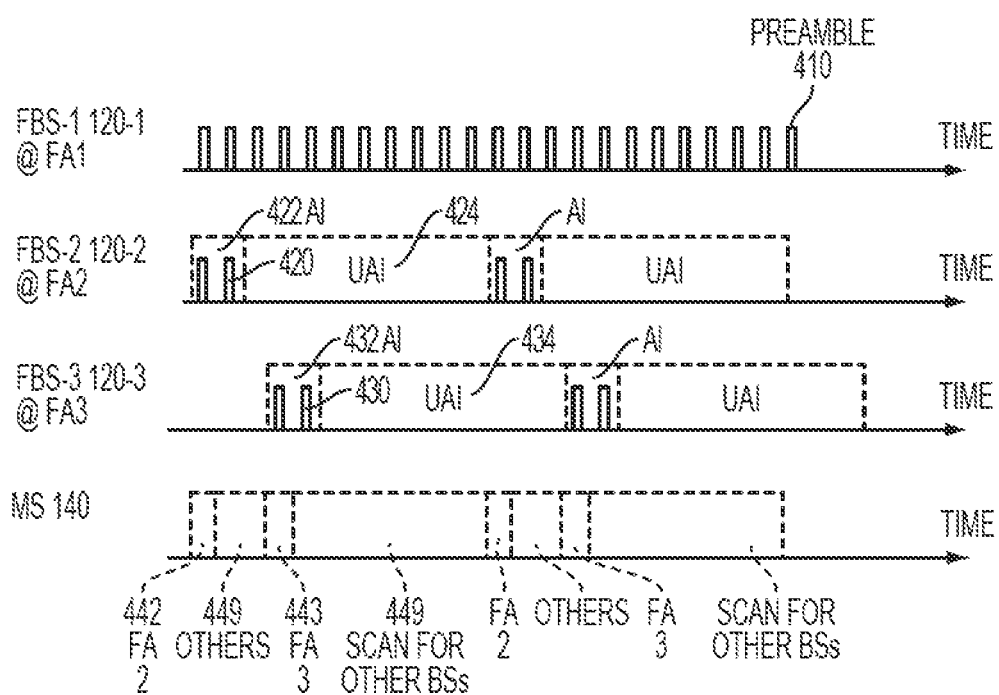
FIG. 4 illustrates timings of Femtocells with the different FAs using different AIs and an MS scanning correspondingly, according to an exemplary embodiment of the present invention.

FIG. 4 illustrates timings of Femtocells with the different FAs using different AIs and an MS scanning correspondingly, according to an exemplary embodiment of the present invention.

Referring to FIG. 4, the active timings of FBS-1 120-1, FBS-2 120-2, FBS 120-3, and the scanning periods of MS 140 are shown. Here, FBS-1 120-1 is operating on a first FA FA1 in a regular mode and is periodically transmitting a preamble signal 410 on its SCH and BCH signals, and/or other signals. In FIG. 4, preambles are shown for simplicity and solely for the purpose of illustration of different frames/superframes to show the periodicity, however, there can be many other signals transmitted. Also, depending on the scenario of the LDC mode, in UAI there may be nothing transmitted, or some signal such as preamble transmitted, etc., as long as in the UAI there are fewer signals transmitting than in the AI. FBS-2 120-2 is operating on a second FA FA2 in an LDC mode and is periodically transmitting preamble signal 420 in its SCH and/or transmitting BCH signals, and/or other signals during AI 422 and may not be transmitting a preamble signal on its SCH during UAI 424. FBS-3 120-3 is operating on a third FA FA3 in an LDC mode and is periodically transmitting preamble signal 430 in its SCH and/or transmitting BCH signals, and/or other signals during AI 432 and may not be transmitting a preamble signal in its SCH during UAI 434. The AIs 422 and 432 may or may not overlap in time but may have substantially the same duration.

MS 140 scans for FBS-2 120-2 on FA2 during scanning period 442, which may at least partially overlap in time with AI 422. MS 140 may attempt to synchronize to FBS-2 120-2 and may acquire further information (such as from a BCH, which may contain the CSG IDs or FBS IDs, with which the MS can compare the stored subscribed CSG IDs or FBS IDs. If the received CSG ID or FBS ID matches the stored list in the MS, the MS then knows the FBS is allowable for it to access) from FBS-2 120-2 to determine whether the MS 140 is authorized to receive service from FBS-2 120-2. In addition, MS 140 scans for FBS-3 120-2 on FA3 during scanning period 443, which may at least partially overlap in time with AI 432. MS 140 may attempt to synchronize to FBS-3 120-3 and acquire further information from FBS-3 120-3 to determine whether the MS 140 is authorized to receive service from FBS-3 120-3. MS 140 may scan on other FAs, such as FA1, during scanning periods 449 for other BSs, e.g., macrocells, Femtocells, such as FBS-1 120-1, etc. Scanning period 449 may at least partially overlap with the UAIs 424 and 434 of FBS-2 120-2 and FBS-3 120-3.

In an exemplary embodiment of the present invention, the FBS (or other types of BSs) or the network may generate the LDC patterns using an algorithm based on FBS FA and the MS may regenerate the LDC pattern based on a given FA using the same algorithm. Here, the LDC patterns do not need to be provided, e.g., broadcast, or multicast, or unicast, or provided by the higher layers or network, etc., to the MS, since the algorithm used to generate the LDC pattern may be known to both the FBS or the network and MS in advance. In this an exemplary embodiment of the present invention, the MS only needs to retain and have broadcast to it the information on FAs of the Femtocells.

An example of the information retained by the MS for generating the LDC pattern is shown in Table 4.

TABLE 4

| Femtocells | FA |
|---|---|
| Femtocell ID1 | 1 |
| Femtocell ID2 | 1 |
| Femtocell ID3 | 2 |
| Femtocell ID4 | 2 |
| Femtocell ID5 | 3 |
| Femtocell ID6 | 3 |

When Table 4 is compared to Table 1, it can be appreciated that memory consumption is reduced in this exemplary embodiment of the present invention. Likewise, overhead needed to provide this information, such as by broadcast, multicast, unicast, etc., is also reduced. An example of the provided information, such as the FBS_ADV message, used to generate the LDC pattern information is shown in Table 5.

TABLE 5

| FBS_ADV |
|---|
| FA1, FA2, FA3 |

When Table 5 is compared to Tables 2 and 3, it can be appreciated that overhead is reduced in this exemplary embodiment of the present invention.

The LDC patterns may be generated using any of a number of techniques. For example, one technique includes mapping certain FA information (e.g., using the index of the FAs) to the LDC pattern information, such as the index of LDC patterns, and the index of the parameters of the LDC patterns such as the timings of the AIs, timings of the UAIs, period of the LDC, etc. The mapping can be, for example, a pseudo-random mapping with a range being the set of possible timings of the AIs of the LDC-pattern. In another technique, functions can be used to serve as the mapping certain FA information (e.g., using the index of the FAs) to the LDC pattern information, such as the index of LDC patterns, and the index of the parameters of the LDC patterns such as the timings of the AIs, timings of the UAIs, period of the LDC, etc. For example, the function can be a hash function with a range being the index of a set of possible timings of the AIs of the LDC mode. For another example, a function may be used with a range being the index of the LDC patterns (e.g., a hash function could be a function with a range being LDC pattern index mapped from the index of FA, such as LDC pattern index=(FA index) mod n, where n is the total number of LDC patterns). All these mappings or functions can be referred to as algorithms instead.

An example of assisting an MS to scan for Femtocells to perform a handover from a Macrocell to a Femtocell is described below with reference to FIG. 5.

Figure 5:
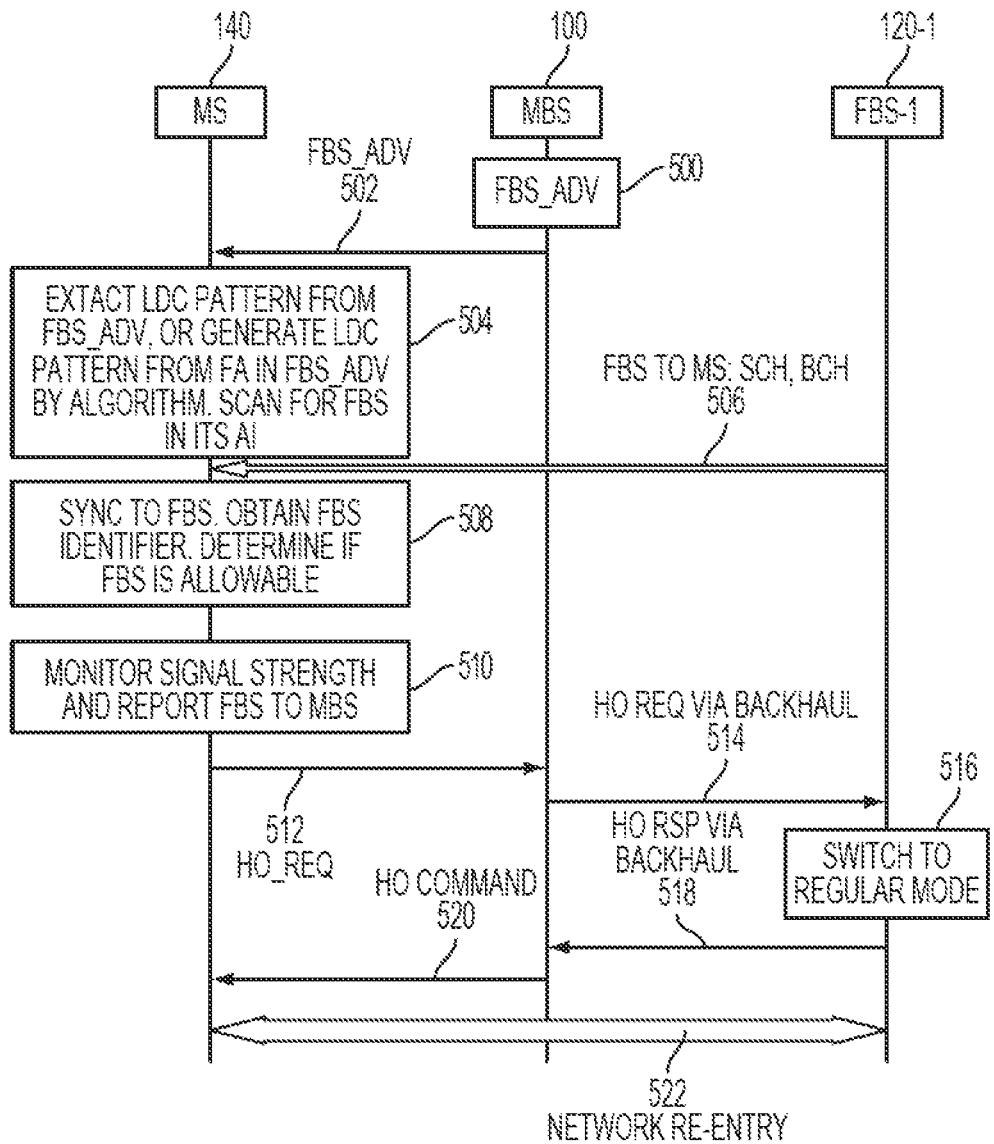
FIG. 5 is a signal diagram illustrating a handover from a Macrocell to a Femtocell in which an MS is assisted in scanning for Femtocells, according to exemplary embodiment of the present invention.

FIG. 5 is a signal diagram illustrating a handover from a Macrocell to a Femtocell in which an MS is assisted in scanning for Femtocells, according to exemplary embodiment of the present invention.

Referring to FIG. 5, MBS 100 generates an FBS_ADV message in step 500. The FBS_ADV message may be generated according to the techniques described herein. MBS 100 (or another type of BS) transmits the FBS_ADV message to MS 140 in step 502. In step 504, MS 140 determines the LDC pattern based on information included in the FBS_ADV message. When the LDC pattern is included in the FBS_ADV message, the MS 140 extracts the LDC pattern and scans for FBSs (and/or other types of BSs) based on the extracted LDC pattern. Alternatively, the FBS_ADV message may only include the FA information of FBSs (and/or other types of BSs). In this case, MS 140 should be aware of the algorithm used by the FBSs to generate their LDC patterns. Here, MS 140 generates the LDC pattern based on the FA information of FBSs and the algorithm used by the FBSs to generate their LDC patterns, and scans for FBSs based on the generated LDC pattern. Alternatively, the LDC patterns can be obtained from the list stored in MS 140.

It is assumed that FBS-1 120-1 is in an LDC mode. Accordingly, FBS-1 120-1 is broadcasting a preamble on its SCH during its AI in step 506. Here, FBS-1 120-1 may also be broadcasting information on its BCH. In step 508, MS 140 detects the preamble in the SCH, synchronizes to FBS-1 120-1, determines the identity of FBS-1 120-1, and determines if it is authorized to access FBS-1 120-1. Herein, it is assumed that MS 140 is authorized to access FBS-1 120-1. In step 510, MS 140 monitors the signal strength of the SCH of FBS-1 120-1 and determines if it should handover to FBS-1 120-1. Herein, it is assumed that MS 140 determines to handover to FBS-1 120-1. In step 512, MS 140 transmits a Handoff Request (HO_REQ) to MBS 100 requesting a handover to FBS-1 120-1. In step 514, the MBS 100 sends the HO_REQ message to FBS-1 120-1 via a backhaul. In step 516, upon receiving the HO_REQ message, the FBS-1 120-1 exits the LDC mode and sends a Handoff Response (HO_RSP) message to the MBS 100 via the backhaul in step 518. The MBS transmits the HO_RSP message to the MS 140 in step 520. The MS then hands over to FBS-1 120-1 in step 522.

In an exemplary embodiment of the present invention, LDC patterns may be generated based on system information. For example, a set of system information (e.g., FA) may be mapped to the start timing of LDC patterns, another set of system information (e.g., Operator ID) may be mapped to a set of possible interval lengths between two AIs, and yet another set of system information (e.g., CSG ID) may be mapped to a set of possible interval lengths of AI. Here, the mappings may be random mappings, hash functions, etc. An example of an LDC pattern according to this exemplary embodiment of the present invention is shown in Table 6.

TABLE 6

| Femtocell FA | LDC pattern (time between two AIs being T) | | |
|---|---|---|---|
| | Starting time of AI | Length of AI | LDC pattern index |
| Femtocell FA1 | Time 1 | Type 1 | 1 |
| | | Type 2 | 2 |
| Femtocell FA2 | Time 2 | Type 1 | 3 |
| | | Type 2 | 4 |
| Femtocell FA3 | Time 3 | Type 1 | 5 |
| | | Type 2 | 6 |

As shown in Table 6, there are two types of lengths for the AI. The starting time of the AI may be mapped from FAs of Femtocells (and/or other types of BSs), while the type of the length of the AI may remain unmapped or may be mapped based on other system information, such as system information that is related to it.

An example according to an exemplary embodiment of the present invention of Femtocells with different FAs and different lengths of AIs, using different AIs, and the MS scanning correspondingly is described below with reference to FIG. 6.

Figure 6:
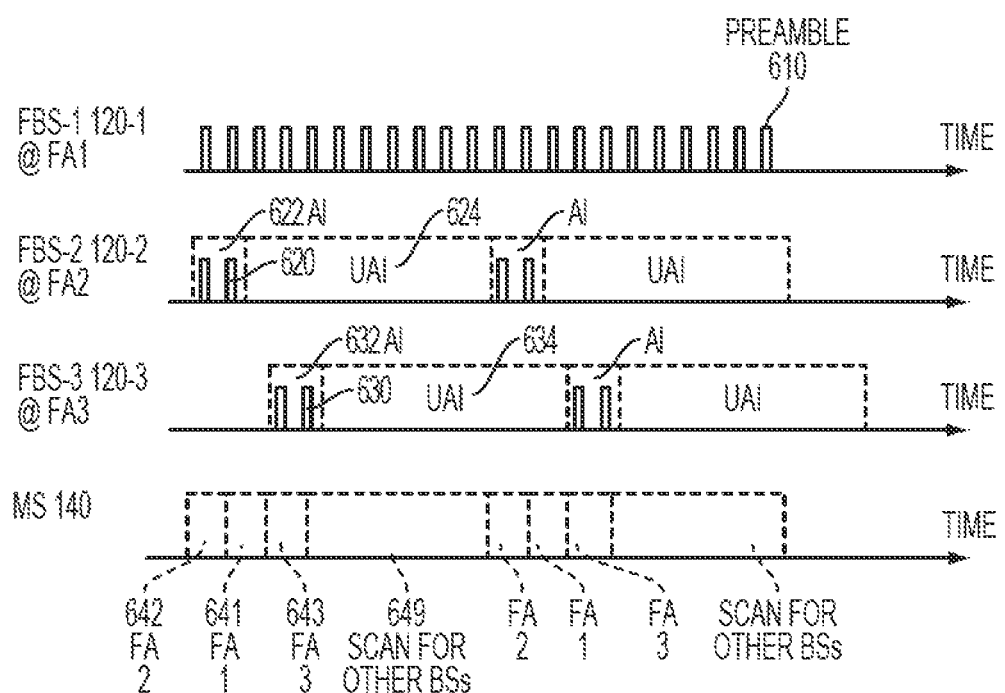
FIG. 6 illustrates timings of Femtocells with the different FAs and different lengths of AIs using different AIs and an MS scanning correspondingly, according to an exemplary embodiment of the present invention.

FIG. 6 illustrates timings of Femtocells with the different FAs and different lengths of AIs using different AIs and an MS scanning correspondingly, according to an exemplary embodiment of the present invention.

Referring to FIG. 6, the active timings of FBS-1 120-1, FBS-2 120-2, FBS 120-3, and the scanning periods of MS 140 are shown. Here, FBS-1 120-1 is operating on first FA FA1 in a regular mode and is periodically transmitting a preamble signal 610 in its SCH and/or transmitting BCH signals, and/or other signals. FBS-2 120-2 is operating on a second FA FA2 in an LDC mode and is periodically transmitting preamble signal 620 in its SCH and/or transmitting BCH signals, and/or other signals during AI 622 and is not transmitting as many signals as in AIs during UAI 624. FBS-3 120-3 is operating on a third FA FA3 in an LDC mode and is periodically transmitting preamble signal 630 in its SCH and/or transmitting BCH signals, and/or other signals only during AI 632 and is not transmitting as many signals as in AIs during UAI 634. The AIs 622 and 632 may or may not overlap in time and may have different lengths.

MS 140 scans for FBS-2 120-2 on FA2 during scanning period 642, which may at least partially overlap in time with AI 622. MS 140 may attempt to synchronize to FBS-2 120-2 and acquire further information from FBS-2 120-2 to determine whether the MS 140 is authorized to receive service from FBS-2 120-2. In addition, MS 140 scans for FBS-3 120-2 on FA3 during scanning period 643, which may at least partially overlap in time with AI 632. MS 140 may attempt to synchronize to FBS-3 120-3 and acquire further information from FBS-3 120-3 to determine whether the MS 140 is authorized to receive service from FBS-3 120-3. The scanning period 642 may be shorter in length than AI 622. Accordingly, MS 140 may scan for FBS-1 120-1 during scanning period 641, which may correspond to the duration of AI 622 that is not overlapped by scanning period 642. Further, MS 140 may scan on other FAs during scanning period 649 for other Femtocells. Scanning period 649 may at least partially overlap the UAIs 624 and 634 of FBS-2 120-2 and FBS-3 120-3.

In an exemplary embodiment of the present invention, the MS derives the location of one or a plurality of ranging channels of a Femtocell (or other type of BS) that is in the LDC mode from information including, but not limited to, system information included in the SCH of the Femtocell, system information included in the BCH of the Femtocell (or other type of BS), and the like. The MS then transmits a ranging signal to the Femtocell via one of the ranging channels that were located using one or a plurality of ranging sequences. Upon receiving the ranging signal from the said mobile station, the Femtocell leaves the LDC mode and returns to a regular mode.

If a Femtocell (or other type of BS) in the LDC mode only sends preambles on the SCH, then the MS may map the preambles of the Femtocell to locate a ranging channel of the Femtocell. If the Femtocell in the LDC mode sends preambles and additional information about the Femtocell, such as an FBS ID, CSG ID, etc., on a BCH, the MS may locate a ranging channel from preambles on the SCH, and/or FBS information from the BCH. For example, the preamble may be mapped to a resource (time/frequency) index and the FBS ID may be mapped to a ranging sequence. In another example, the preamble may be mapped to a resource (time) index, the CSG ID may be mapped to a resource (frequency) index, and the FBS ID may be mapped to a ranging sequence.

Since the Femtocell knows the scheme used for generating the ranging sequence, the Femtocell only monitors the resource allocation generated by the scheme, and uses the ranging sequence generated by the scheme and parameters used by the MS, to match the received ranging signal. Upon receiving and detecting the ranging signal, the Femtocell will wake up and return to the regular mode.

The scheme used for generating the ranging channel may be, for instance, a mapping from preambles or other Femtocell information such as the FBS ID, the CSG ID, etc., to a resource allocation index and a ranging sequence, such as a random mapping to the resource allocation index or ranging sequence. In addition, the scheme used for generating the ranging channel may be a hash function mapping to the index of a set of possible resource allocations of a ranging sequence (e.g., a hash function could be LDC pattern index=(base station information index)mod n, where n is the total number of ranging channel patterns). In addition, the scheme used for generating the ranging channel may be to use different functions to map different attributes of FBS information to different attributes of a ranging channel, e.g., a preamble is mapped to a resource index via function 1, a CSG ID is mapped to a ranging sequence via function 2, etc.

A benefit of this exemplary embodiment is that the FBS (or other type of BS) only needs to monitor limited resources to detect ranging and thus it reduces the collision and interference because different FBSs can be mapped to different ranging channels and each FBS will only listen to that particular channel. Also, the benefit of this exemplary embodiment is particularly evident when compared to the case where the FBS may use the entire uplink to be a ranging, which increase the complexity and power consumption of an FBS because it needs to monitor a much larger bandwidth for a much longer time.

Another benefit of this exemplary embodiment is that the ranging channel may be dynamically assigned, rather than being statically reserved. A randomization or hopping may also be applied in the ranging channel allocation or reservation. The randomization of assigning the ranging channel reduces interference across Femtocells (or other types of BSs).

Still another benefit of this exemplary embodiment is that there will be less overhead consumed over the air for the FBS (or other types of BSs) to inform the MS of the ranging channel it is to use to wake up the FBS, as compared with the FBS broadcasting the ranging channel allocation over the air.

An example of the MS generating a ranging channel and waking up an FBS in the LDC mode is described below with reference to FIG. 7.

Figure 7:
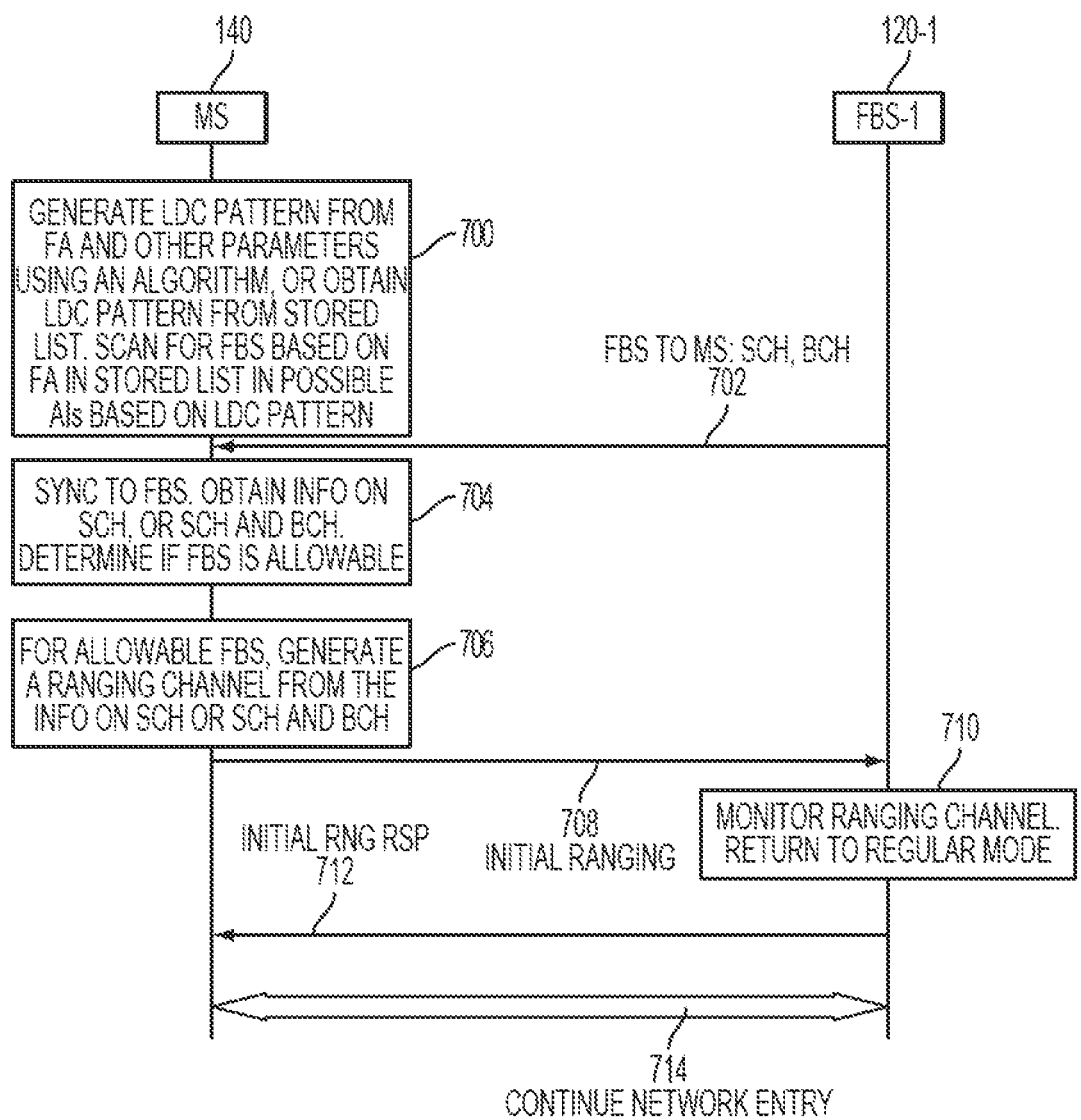
FIG. 7 is a signal diagram illustrating an MS generating a ranging channel and waking up an FBS in a LDC mode, according to exemplary embodiment of the present invention.

FIG. 7 is a signal diagram illustrating an MS generating a ranging channel and waking up an FBS in a LDC mode, according to exemplary embodiment of the present invention.

Referring to FIG. 7, the MS 140 uses an algorithm to generate the LDC pattern based on FA and other parameters and then scans for FBSs (and/or other types of BSs) based on the generated LDC pattern in step 700. Alternatively, in step 700, the MS 140 may use an LDC pattern it has stored in a list. Herein, it is assumed that FBS-1 120-1 is in an LDC mode. Accordingly, FBS-1 120-1 broadcasts a preamble signal in its SCH during its AI in step 702. Here, FBS-1 120-1 may also broadcast information in a BCH. In step 704, MS 140 detects the SCH, synchronizes to FBS-1 120-1, may determine whether FBS-1 120-1 is in the LDC mode, may determine the length of the AI, may determine the identity of FBS-1 120-1, and may determine if it is authorized to access FBS-1 120-1. Herein, it is assumed that MS 140 is authorized to access FBS-1 120-1. Further, MS 140 may monitor the signal strength of the SCH to determine if it should access FBS-1 120-1. Herein, it is assumed that MS 140 determines it should access FBS-1 120-1. In step 706, the MS 140 generates a ranging channel from the information in the SCH. Alternatively, the MS 140 generates a ranging channel from the information in the SCH and the BCH. In step 708, the MS transmits an initial ranging to FBS-1 120-1. In step 710, the FBS-1 120-1, while monitoring the ranging channel, detects the initial ranging message and in step 712, transmits an initial ranging response (Initial RNG) message to MS 140. Thereafter, NE of MS 140 is performed with FBS-1 120-1 in step 714.

Figure 8:
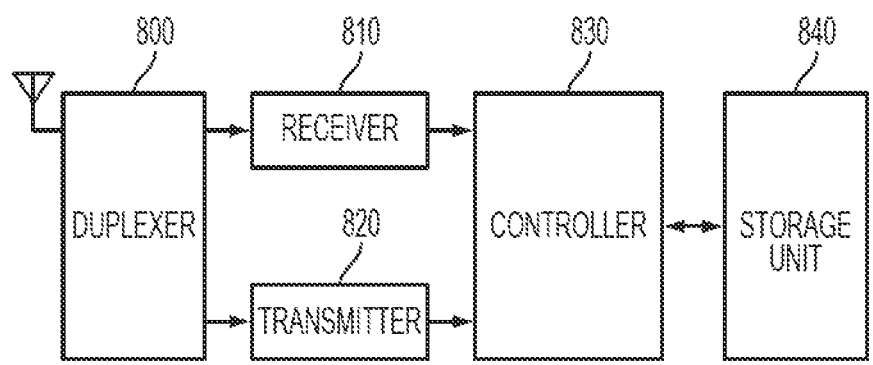
FIG. 8 is a block diagram illustrating an MS in a wireless communication system according to an exemplary embodiment of the present invention.

FIG. 8 is a block diagram illustrating an MS in a wireless communication system according to an exemplary embodiment of the present invention.

Referring to FIG. 8, the MS includes a duplexer 800, a receiver 810, a transmitter 820, a controller 830, and a storage unit 840. The MS may include any number of additional structural elements. However, a description of additional structural elements of the MS is omitted for conciseness.

The duplexer 800 transmits a transmission signal provided from the transmitter 820 via an antenna, and provides a reception signal from the antenna to the receiver 810 according to a duplexing scheme.

The receiver 810 converts the reception signal provided from the duplexer 800 into a baseband signal, and provides the baseband signal to the controller 830. For example, when the wireless communication system uses an Orthogonal Frequency Division Multiplexing (OFDM) scheme, the receiver 810 includes a Radio Frequency (RF) processor, an Analog/Digital Converter (ADC), an OFDM demodulator, and a decoder. Accordingly, the RF processor converts an RF signal provided from the duplexer 800 into a baseband analog signal. The ADC converts the analog signal provided from the RF processor into digital sample data. The OFDM demodulator transforms sample data in a time domain provided from the ADC into data in a frequency domain by performing a Fast Fourier Transform (FFT). The decoder demodulates and decodes a signal provided from the OFDM demodulator according to a Modulation and Coding Scheme (MCS) level.

The controller 830 controls overall operations of the MS. The operations of MS include any of the operations explicitly or implicitly described above as being performed by an MS, such as MS 140. For example, the controller 830 may control the receiver and transmitter, may control to obtain LDC information of one or more BSs in LDC mode. The LDC information may include an LDC pattern, an index of the LDC pattern, system information including an FA, an index of FA, a BS ID, a CSG ID, and an Operator ID. The LDC information may also include a mapping of the system information to LDC pattern, an algorithm used to determine the LDC patterns from system information, and an algorithm used to determine a ranging resource used to perform the follow-up operation. The LDC pattern may include at least one of an AI and a UAI where the LDC pattern can be captured as a triple of the parameters as explained earlier (e.g., starting time of the AIs, AI length, UAI length, or starting time of the AIs, AI length, LDC cycle, etc.)

The controller may also determine the LDC patterns of the one or more BSs in LDC mode based on the LDC information, may control to search for any of the one or more BSs in LDC mode during their respective AI, and, if a BS is found, may control to perform a follow-up operation based on the found BS.

The transmitter 820 converts a transmission signal into an RF signal, and provides the RF signal to the duplexer 800 under control of the controller 830. For example, when the wireless communication system uses an OFDM scheme, the transmitter 820 includes an encoder, an OFDM modulator, a Digital/Analog Converter (DAC) and an RF processor. The encoder encodes and modulates a transmission signal according to an MCS level under control of the controller 830. The OFDM modulator converts data in the frequency domain provided from the encoder into sample data (i.e., an OFDM symbol) in a time domain by performing an Inverse FFT (IFFT). The DAC converts sample data provided from the OFDM modulator into an analog signal. The RF processor converts a baseband analog signal provided from the DAC into an RF signal.

The storage unit 840 stores programs required for overall operations of the MS and various data, including any of the information and/or the algorithms discussed herein as being received, transmitted, retained or used by an MS. For example, storage unit 840 may store information such as LDC patterns of BSs, and/or the mapping between some system information such as the FA of BSs, and LDC patterns of the BSs, where the LDC pattern can be captured as a triple of the parameters as explained earlier (e.g., starting time of the AIs, AI length, UAI length, or starting time of the AIs, AI length, LDC cycle, etc.).

Figure 9:
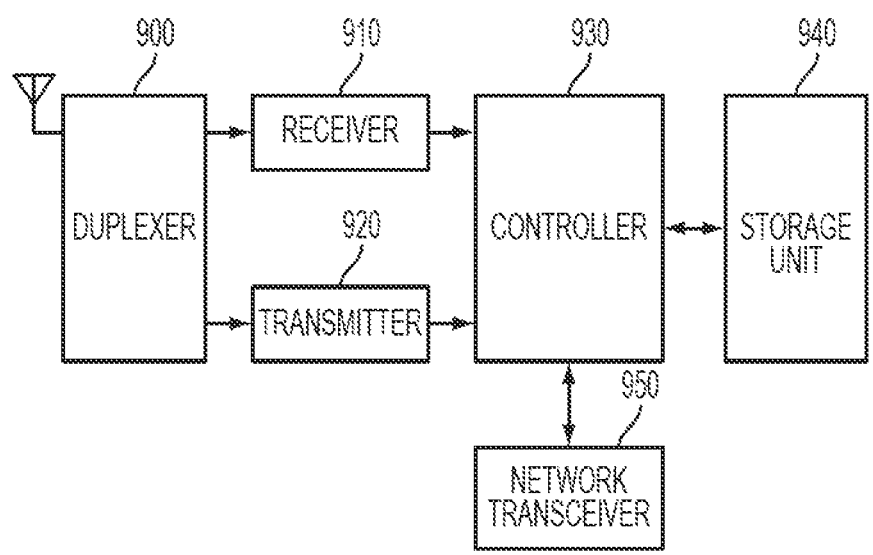
FIG. 9 is a block diagram illustrating a BS in a wireless communication system according to an exemplary embodiment of the present invention.

FIG. 9 is a block diagram illustrating a BS in a wireless communication system according to an exemplary embodiment of the present invention.

Referring to FIG. 9, the BS includes a duplexer 900, a receiver 910, a transmitter 920, a controller 930, a storage unit 940, and a network transceiver 950. The BS may include any number of additional structural elements. However, a description of additional structural elements of BS is omitted for conciseness. The BS may be any type of BS including a Relay, a Picocell, a Microcell, a Femtocell, a Ubicell, etc.

The duplexer 900 transmits a transmission signal provided from the transmitter 920 via an antenna, and provides a reception signal from the antenna to the receiver 910 according to a duplexing scheme.

The receiver 910 converts a reception signal provided from the duplexer 900 into a baseband signal and provides the baseband signal to the controller 930. For example, when the wireless communication system uses an OFDM scheme, the receiver 910 includes an RF processor, an ADC, an OFDM demodulator and a decoder. The RF processor converts an RF signal provided from the duplexer 900 into a baseband analog signal. The ADC converts the analog signal provided from the RF processor into digital sample data. The OFDM demodulator converts sample data in the time domain provided from the ADC into data in the frequency domain by performing FFT. The decoder demodulates and decodes a signal provided from the OFDM demodulator according to an MCS level.

The controller 930 controls overall operations of the BS. The operations of the BS include any of the operations explicitly or implicitly described above as being performed by a BS, such as an FBS. For example, the controller 930 may control the receiver, transmitter and network transceiver, may control to obtain LDC information. The LDC information may include an LDC pattern, an index of the LDC pattern, system information including an FA, an index of FA, a BS ID, a CSG ID, and an Operator ID. The LDC information may also include a mapping of the system information to LDC pattern, an algorithm used to determine the LDC patterns from system information, and an algorithm used to determine a ranging resource used to perform the follow-up operation. The LDC pattern may include at least one of an AI and a UAI where the LDC pattern can be captured as a triple of the parameters as explained earlier (e.g., starting time of the AIs, AI length, UAI length, or starting time of the AIs, AI length, LDC cycle, etc.).

The controller may control to generate a message including at least a portion of the LDC information, and may control to send the generated message to at least one MS.

The transmitter 920 converts a transmission signal into an RF signal and provides the RF signal to the duplexer 900 under control of the controller 930. For example, when the wireless communication system uses an OFDM scheme, the transmitter 920 includes an encoder, an OFDM modulator, a Digital/Analog Converter (DAC) and an RF processor. The encoder encodes and modulates a transmission signal according to an MCS level under control of the controller 930. The OFDM modulator converts data in the frequency domain provided from the encoder to sample data (i.e., an OFDM symbol) in the time domain by performing IFFT. The DAC converts sample data provided from the OFDM modulator into an analog signal. The RF processor converts a baseband analog signal provided from the DAC into an RF signal.

The storage unit 940 stores programs required for overall operations of the BS and various data including any of the information and/or algorithms discussed herein as being received, transmitted, retained or used by a BS, such as an FBS.

The network transceiver 950 facilities communication with at least one of other BSs and a CN of a wireless communication system, such as a wireless communication system operating according to the IEEE 802.16m or 3GPP LTE standards. When the BS is a FBS the network transceiver 950 may be a broadband transceiver.

Exemplary embodiments of the present invention provide techniques for supporting the LDC mode in a wireless communication system.

Certain aspects of the present invention may also be embodied as computer readable code on a computer readable recording medium. A computer readable recording medium is any data storage device that can store data, which can be thereafter read by a computer system. Examples of the computer readable recording medium include Read-Only Memory (ROM), Random-Access Memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for a Mobile Station (MS) to search for a Base Station (BS) in Low Duty Cycle (LDC) mode in a wireless communication system, the method comprising:

receiving, by the MS, system information of one or more BSs in LDC mode;

obtaining, by the MS, LDC information of one or more BSs in LDC mode;

determining, by the MS, the LDC patterns of the one or more BSs in LDC mode based on the LDC information, the LDC patterns comprising at least one of an Available Interval (AI), an UnAvailable Interval (UAI), a starting time of the AI, an ending time of the AI, a length of the AI, a starting time of the UAI, an ending time of the UAI, a length of the UAI, and a cycle of the LDC;

searching, by the MS, for any of the one or more BSs in LDC mode during their respective AI; and if a BS is found, performing a follow-up operation based on the found BS, wherein the determining of the LDC patterns of the one or more BSs in LDC mode based on the LDC information comprises executing a set of instructions by at least one processor to perform an algorithm stored on a computer-readable storage medium that determines the LDC patterns of the one or more BSs in LDC mode using at least the system information received by the MS.

2. The method of claim 1, wherein at least a portion of the LDC information is obtained from at least one of a storage unit of the MS in which the at least a portion of the LDC information is pre-provisioned and a message received via one of a broadcast, multicast, and unicast.

3. The method of claim 2, wherein the message at least one of originates from one of a BS from which the message is received, another BS, a Self-Organized Network (SON) server, an entity in a higher layer of the wireless communication system, and another entity of the wireless communication system, and comprises one of a BS advertisement message, a neighbor list advertisement message, and a Multiple Access Control (MAC) message.

4. The method of claim 1, wherein the LDC information of the one or more BSs in LDC mode comprises at least one of the LDC pattern, an index of the LDC pattern, system information, a mapping of the system information to the LDC pattern, an algorithm used to determine the LDC pattern from system information, and an algorithm used to determine a ranging resource used to perform the follow-up operation, and wherein the system information comprises at least one of a Frequency Allocation (FA), an index of FA, a BS IDentifier (ID), a Closed Subscriber Group (CSG) ID, and an Operator ID.

5. The method of claim 4, wherein the algorithm used to determine the LDC patterns from the system information is the same algorithm as an algorithm used by the one or more BSs in LDC mode to determine their LDC patterns.

6. The method of claim 4, wherein the algorithm used to determine the LDC patterns from the system information comprises at least one of a pseudo random mapping of at least a portion of the system information to the LDC pattern with a range being a set of possible AIs of the one or more BS in LDC mode, a hash function with a range being an index of a set of possible AIs of the one or more BSs in LDC mode, and a function with a range being the LDC pattern index mapped from the index of FA.

7. The method of claim 1, further comprising:
searching for any of one or more BSs not in LDC mode during a time when all of the one or more BSs in LDC mode are not in an AI.

8. The method of claim 1, wherein the follow-up operation comprises at least one of setting the found BS as a candidate BS, reporting the found BS to the wireless communication system for BS selection, BS reselection, network entry, network re-entry, or handover, and performing BS selection, BS reselection, network entry, network re-entry, or handover with the found BS.

9. The method of claim 1, further comprising:
receiving at least one of a synchronization channel and broadcast channel from the found BS; and
determining a ranging channel of the found BS based on at least one of information determined from the synchronization channel, information determined from the broadcast channel, and a mapping between the information determined from at least one of the synchronization channel and the broadcast channel, to a resource index,
wherein the follow-up operation comprises transmitting a ranging message to the found BS in the determined ranging channel.

10. The method of claim 1, wherein any of the one or more BSs comprise one of a relay, a picocell BS, a microcell BS, a macrocell BS, and a femtocell BS.

11. A Mobile Station (MS) apparatus to search for a Base Station (BS) in Low Duty Cycle (LDC) mode in a wireless communication system, the apparatus comprising:
a receiver for receiving signals from at least one BS;
a transmitter for transmitting signals to the at the least one BS; and
a controller for controlling the receiver and the transmitter, for controlling to receive system information of one or more BSs in LDC mode, and to obtain LDC information of one or more BSs in LDC mode, for determining the LDC patterns of the one or more BSs in LDC mode based on the LDC information, the LDC patterns comprising at least one of an Available Interval (AI), an UnAvailable Interval (UAI), a starting time of the AI, an ending time of the AI, a length of the AI, a starting time of the UAI, an ending time of the UAI, a length of the UAI, and a cycle of the LDC, for controlling to search for any of the one or more BSs in LDC mode during their respective AI, and, if a BS is found, for controlling to perform a follow-up operation based on the found BS,
wherein the determining of the LDC patterns of the one or more BSs in LDC mode based on the LDC information comprises executing a set of instructions by at least one processor to perform an algorithm stored on a computer-readable storage medium that determines the LDC patterns of the one or more BSs in LDC mode using at least the system information received by the MS.

12. The apparatus of claim 11, wherein the controller controls to obtain at least a portion of the LDC information from at least one of a message received via one of a broadcast, multicast, and unicast, and a storage unit in which the at least a portion of the LDC information is pre-provisioned.

13. The apparatus of claim 12, wherein the message at least one of originates from one of a BS from which the message is received, another BS, a Self-Organized Network (SON) server, an entity in a higher layer of the wireless communication system, and another entity of the wireless communication system, and comprises one of a BS advertisement message, a neighbor list advertisement message, and a Multiple Access Control (MAC) message.

14. The apparatus of claim 11, wherein the LDC information of the one or more BSs in LDC mode comprises at least one of the LDC pattern, an index of the LDC pattern, system information, a mapping of the system information to the LDC pattern, an algorithm used to determine the LDC pattern from system information, and an algorithm used to determine a ranging resource used to perform the follow-up operation, and wherein the system information comprises at least one of a Frequency Allocation (FA), an index of FA, a BS IDentifier (ID), a Closed Subscriber Group (CSG) ID, and an Operator ID.

15. The apparatus of claim 14, wherein the algorithm used to determine the LDC patterns from the system information is the same algorithm as an algorithm used by the one or more BSs in LDC mode to determine their LDC patterns.

16. The apparatus of claim 14, wherein the algorithm used to determine the LDC patterns from the system information comprises at least one of a pseudo random mapping of at least a portion of the system information to the LDC pattern with a range being a set of possible AIs of the one or more BS in LDC mode, a hash function with a range being an index of a set of possible AIs of the one or more BSs in LDC mode, and a function with a range being the LDC pattern index mapped from the index of FA.

17. The apparatus of claim 11, wherein the controller controls to search for any of one or more BSs not in LDC mode during a time when all of the one or more BSs in LDC mode are not in an AI.

18. The apparatus of claim 11, wherein the follow-up operation comprises at least one of setting the found BS as a candidate BS, reporting the found BS to the wireless communication system for BS selection, BS reselection, network entry, network re-entry, or handover, and performing BS selection, BS reselection, network entry, network re-entry, or handover with the found BS.

19. The apparatus of claim 11, wherein the controller controls the receiver to receive at least one of a synchronization channel and broadcast channel from the found BS, and determines a ranging channel of the found BS based on at least one of information determined from the synchronization channel, information determined from the broadcast channel, and a mapping between the information determined from at least one of the synchronization channel and the broadcast channel, to a resource index, and
wherein the follow-up operation comprises transmitting a ranging message to the found BS in the determined ranging channel.

20. The apparatus of claim 11, wherein any of the one or more BSs comprise one of a relay, a picocell BS, a microcell BS, a macrocell BS, and a femtocell BS.

21. A method for a network entity in a wireless communication network to assist or support a Mobile Station (MS) to search for a Base Station (BS) in Low Duty Cycle (LDC) mode, the method comprising:
obtaining LDC information of LDC patterns of one or more BSs in LDC mode, the LDC patterns comprising at least one of an Available Interval (AI), an UnAvailable Interval (UAI), a starting time of the AI, an ending time of the AI, a length of the AI, a starting time of the UAI, an ending time of the UAI, a length of the UAI, and a cycle of the LDC;
generating a message including at least a portion of the LDC information; and
sending the generated message to at least one MS,
wherein the LDC information comprises at least one of an algorithm used to determine the LDC pattern from system information, and an algorithm used to determine a ranging resource used to perform the follow-up operation and wherein the at least one MS to which the generated message is sent comprises a computer-readable storage medium on which the algorithm is stored, and at least one processor to execute at least one of the algorithm used to determine the LDC pattern from system information, and the algorithm used to determine a ranging resource used to perform the follow-up operation.

22. The method of claim 21, wherein the sending of the generated message to the at least one MS comprises sending the message to the at least one MS via one of pre-provisioning, broadcast, multicast, and unicast.

23. The method of claim 21, wherein the network entity comprises one of a relay, a picocell BS, a microcell BS, a macrocell BS, a femtocell BS, and a Self-Organized Network (SON) server, and wherein any of the one or more BSs comprise one of a relay, a picocell BS, a microcell BS, a macrocell BS, and a femtocell BS.

24. The method of claim 21, wherein the message comprises one of a BS advertisement message, a neighbor list advertisement message, and a Multiple Access Control (MAC) message.

25. The method of claim 21, wherein the LDC information on the LDC patterns of the one or more BSs in LDC mode further comprises at least one of the LDC pattern, an index of the LDC pattern, system information, a mapping of the system information to the LDC pattern, and
wherein the system information comprises at least one of a Frequency Allocation (FA), an index of FA, a BS IDentifier (ID), a Closed Subscriber Group (CSG) ID, and an Operator ID.

26. The method of claim 25, wherein the algorithm used to determine the LDC patterns from system information is the same algorithm as an algorithm used by the one or more BSs in LDC mode to determine their LDC patterns.

27. The method of claim 25, wherein the algorithm used to determine the LDC patterns from system information comprises at least one of a pseudo random mapping of at least a portion of the system information to the LDC pattern with a range being a set of possible AIs of the one or more BS in LDC mode, a hash function with a range being an index of a set of possible AIs of the one or more BSs in LDC mode, and a function with a range being the LDC pattern index mapped from the index of FA.

28. The method of claim 21, wherein the AIs of BSs, of the one or more BSs in LDC mode, operating on the same Frequency Allocation (FA), comprise a starting point at the same time.

29. The method of claim 21, wherein the LDC patterns of BSs, of the one or more BSs in LDC mode, operating on the same Frequency Allocations (FAs), are the same.

30. The method of claim 21, wherein the LDC patterns of BSs, of the one or more BSs in LDC mode, operating on different Frequency Allocations (FAs), are different.

31. A network entity apparatus in a wireless communication network to assist or support a Mobile Station (MS) to search for a Base Station (BS) in Low Duty Cycle (LDC) mode, the apparatus comprising:
a receiver for receiving signals from at least one MS;
a transmitter for transmitting signals to the at the least one MS;
a network transceiver for receiver and transmitting signals from and to at least one other network entity apparatus in the wireless communication network; and
a controller for controlling the receiver, transmitter and network transceiver, for controlling to obtain LDC information of LDC patterns of one or more BSs in LDC mode, the LDC patterns comprising at least one of an Available Interval (AI), an UnAvailable Interval (UAI), a starting time of the AI, an ending time of the AI, a length of the AI, a starting time of the UAI, an ending time of the UAI, a length of the UAI, and a cycle of the LDC, for controlling to generate a message including at least a portion of the LDC information, and for controlling to send the generated message to at least one MS,
wherein the LDC information comprises at least one of an algorithm used to determine the LDC pattern from system information, and an algorithm used to determine a ranging resource used to perform the follow-up operation and wherein the at least one MS to which the generated message is sent comprises a computer-readable storage medium on which the algorithm is stored, and at least one processor to execute at least one of the algorithm used to determine the LDC pattern from system information, and the algorithm used to determine a ranging resource used to perform the follow-up operation.

32. The apparatus of claim 31, wherein the controller, when controlling to send the generated message to the at least one MS, controls to send the message to the at least one MS via one of pre-provisioning, broadcast, multicast, and unicast.

33. The apparatus of claim 31, wherein the apparatus comprises one of a relay, a picocell BS, a microcell BS, a macrocell BS, a femtocell BS, and a Self-Organized Network (SON) server, and
- wherein any of the one or more BSs comprise one of a relay, a picocell BS, a microcell BS, a macrocell BS, and a femtocell BS.

34. The apparatus of claim 31, wherein the message comprises one of a BS advertisement message, a neighbor list advertisement message, and a Multiple Access Control (MAC) message.

35. The apparatus of claim 31, wherein the LDC information on the LDC patterns of the one or more BSs in LDC mode comprises the LDC pattern, an index of the LDC pattern, system information a mapping of the system information to the LDC pattern, and
- wherein the system information comprises at least one of a Frequency Allocation (FA), an index of FA, a BS IDentifier (ID), a Closed Subscriber Group (CSG) ID, and an Operator ID.

36. The apparatus of claim 35, wherein the algorithm used to determine the LDC patterns from system information is the same algorithm as an algorithm used by the one or more BSs in LDC mode to determine their LDC patterns.

37. The apparatus of claim 35, wherein the algorithm used to determine the LDC patterns from system information comprises at least one of a pseudo random mapping of at least a portion of the system information to the LDC pattern with a range being a set of possible AIs of the one or more BS in LDC mode, a hash function with a range being an index of a set of possible AIs of the one or more BSs in LDC mode, and a function with a range being the LDC pattern index mapped from the index of FA.

38. The apparatus of claim 31, wherein the AIs of BSs, of the one or more BSs in LDC mode, operating on the same Frequency Allocation (FA), comprise a starting point at the same time.

39. The apparatus of claim 31, wherein the LDC patterns of BSs, of the one or more BSs in LDC mode, operating on the same Frequency Allocations (FAs), are the same.

40. The apparatus of claim 31, wherein the LDC patterns of BSs, of the one or more BSs in LDC mode, operating on different Frequency Allocations (FAs), are different.

\* \* \* \* \*